United States Patent [19]

Shryock et al.

[11] 3,937,282

[45] Feb. 10, 1976

[54] METHOD FOR CEMENTING WELLS IN LOW TEMPERATURE FORMATIONS

[75] Inventors: Stanley H. Shryock, Brea, Calif.; Charles R. George; Willis C. Cunningham, both of Duncan, Okla.

[73] Assignee: Halliburton Company, Duncan, Okla.

[22] Filed: Mar. 24, 1975

[21] Appl. No.: 561,570

Related U.S. Application Data

[60] Division of Ser. No. 374,609, June 28, 1973, Pat. No. 3,891,454, which is a continuation of Ser. No. 129,983, March 31, 1971, abandoned, which is a continuation-in-part of Ser. No. 821,946, May 5, 1969, abandoned.

[52] U.S. Cl. ............... 166/293; 106/89; 106/315; 166/DIG. 1
[51] Int. Cl.² ........................................ E21B 33/13
[58] Field of Search ............... 106/89, 90, 109, 315; 166/293, 294, 295, DIG. 1

[56] References Cited
UNITED STATES PATENTS

| | | | |
|---|---|---|---|
| 2,292,616 | 8/1942 | Dailey | 166/293 |
| 2,607,427 | 8/1952 | Bond et al. | 166/293 |
| 2,672,424 | 3/1954 | Avery | 106/90 |
| 2,690,975 | 10/1954 | Scripture | 106/315 |
| 2,798,003 | 7/1957 | Morgan et al. | 106/90 |
| 2,840,483 | 6/1958 | Morgan et al. | 166/293 |
| 3,179,528 | 4/1965 | Holmgren et al. | 166/DIG. 1 |
| 3,582,376 | 7/1971 | Ames | 106/315 |

OTHER PUBLICATIONS

"Gypsum Blend Cements Show Promise for North Slope Use," The Oil & Gas Journal, May 19, 1969, p. 58.

Primary Examiner—Ernest R. Purser
Assistant Examiner—Jack E. Ebel
Attorney, Agent, or Firm—Thomas R. Weaver; John H. Tregoning

[57] ABSTRACT

The present invention relates to a composition and method for cementing pipe and casing in wells in low temperature earth formations and relates more particularly to the cementing of casing oil and gas wells drilled through permafrost formations.

14 Claims, No Drawings

METHOD FOR CEMENTING WELLS IN LOW TEMPERATURE FORMATIONS

This is a Divisional application of application Ser. No. 374,609, filed June 28, 1973, now Pat. No. 3,891,454 which is a Continuation of application Ser. No. 129,983, filed Mar. 31, 1971, now abandoned, which is a Continuation-In-Part of application Ser. No. 821,946, filed May 5, 1969, now abandoned.

The present invention relates to compositions and methods for cementing casing in oil and gas wells and the like, in formations existing in low temperatures.

Many various methods and hydraulic cement compositions for carrying out cementing operations in oil and gas wells have been developed. For example, cements of the hydraulic setting type are commonly used for cementing pipe or casing in a well bore. In this operation, the cement composition is normally introduced into the well through the casing or a pipe so that the introduced cement slurry can be displaced into the space between the casing and the surrounding formation. The cement slurry sets into a solid mass thereby bonding the casing to the formation and filling the annular space between the casing and the well bore to prevent debris from entering the annular space.

In areas such as Canada and Alaska where oil and gas wells are drilled through formations existing at low temperatures, often below freezing, problems have been encountered in the use of prior cementing compositions and methods. For example, after cementing surface pipe or casing in an oil or gas well, it is ordinarily desirable to proceed with further operations as quickly as possible, often within a few hours after placement of the cement slurry in the well. If the formation into which the cement slurry has been placed exists at low temperatures, conventional slurries often require long periods of time to obtain sufficient compressive strength for resumption of drilling operations.

Additionally, in areas where oil or gas wells must be drilled through frozen formations, such as a unique strata found in the northern-most regions of Alaska and Canada, commonly referred to as the permafrost, failures have occurred due to a thawing of the formation brought about by heat of hydration transferred to the formation from the cement slurry as the cement slurry sets. When the formation is melted, hole enlargement or water flow may occur and the casing will not be bonded to the formation by the cement. Furthermore, problems have been encountered after the surface pipe has been cemented in the permafrost strata due to heat transferred through the surface pipe and cement into the permafrost strata upon resumption of drilling operations. That is, heat contained in the drilling fluid is readily transferred through the casing and cement into the formation resulting in hole enlargement around the cement due to melting of the formation. Such a heat loss has been known to have an adverse effect on the reliability of blowout preventer equipment.

Difficulties have also been encountered with conventional cement compositions freezing either during mixing or during curing.

The present invention provides a composition for cementing wells in formations having temperatures of less than about 80°F, said composition comprising cement, calcium sulfate hemihydrate, a setting time retarding agent, a densifier, a freezing point depressant and a relatively small quantity of water. Said composition provides a high strength cement having a short curing time which will not freeze before setting at low formation temperatures and which because of its low heat of hydration, will not melt permafrost formations. The invention provides a method for cementing pipe and casing into a well bore drilled through low temperature formations which comprises placing a slurry in the well bore and allowing it to set.

Any of a wide variety of commercially available cements may be used in producing the composition of this invention. The American Society for Testing Materials has established a classification for Portland cements and of those, Classes I, II, III, IV or V are useful in the present invention. The American Petroleum Institute has also established a classification for Portland cements. Of those, API Classes A, B, C, G, or H are useful in the present invention.

High alumina cements such as lumnite cement and Ciment Fondu have limited usefulness because of the high heat of hydration they develop. Most cements have an alumina ($Al_2O_3$) concentration of from about 8% to about 15% by weight. Lumnite cements and Ciment Fondu, however, have alumina concentrations of about 40% by weight. Such high alumina concentrations result in quick setting cement slurries having a high heat of hydration. The high heat of hydration occurring while the cement slurry is curing may melt the ice which holds the permafrost formation together, thus enlarging the bore hole. Enlargement of the bore hole by melting the permafrost is a highly undesirable event because it causes the cement and the casing to fit loosely in the bore hole.

The elements of the composition of the present invention are measured as parts of a "sack" of solids. Each sack of solids, which comprises all the elements of the present invention except water, weighs about 75 pounds and occupies about one cubic foot of space. The word "sack" as used hereinafter shall mean a 75-pound sack of solids.

The cement should be present in the slurry of water and solids in a concentration of from about 15 pounds to about 35 pounds per sack. Concentrations of cement lower than about 15 pounds per sack do not give a useful buildup in compressive strengths as the cement cures. Concentrations of cement in the composition of greater than about 35 pounds per sack do not give adequate early strengths during the curing time just after the cement has been placed in the well bore.

The preferred concentration of cement in the slurry of the present invention is about 26 pounds per sack.

Any commercially available ground calcium sulfate hemihydrate ($CaSO_4 \cdot 1/2\ H_2O$), commonly known as gypsum, may be used in the present invention. A gypsum which has been ground so that from about 75% to about 90% of a representative sample will pass through a 100-mesh (Tyler) screen is preferred, although any commercially ground gypsum is useful.

The purpose of the gypsum is to provide strength to the cement slurry while it is curing, commonly referred to as "high early" strength. As the composition cures the cement begins to provide strength; however, during the first few hours after the slurry has been placed, the strength is provided by the gypsum. The high early strengths are important because it is often desirable to resume activity in the well as soon as possible after the slurry has been placed between the pipe or casing and the wall of the well bore. A useful slurry should set into a strong cementitious composition soon after it has been placed. Long delays in drilling or other operations in the well bore while waiting for a cement to gain high strengths cause great expense and loss of time and are, therefore, undesirable.

The $CaSO_4 \cdot 1/2\ H_2O$ should be present in a gypsum to cement ratio of from about 1:1 to about 3:1. Gypsum to cement ratios of less than about 1:1 do not give adequate early strength to the cementitious composition after it has been placed. Gypsum to cement ratios of greater than about 3:1 give adequate high early strength but do not give adequate buildup of compressive strength upon curing. The gypsum does not provide long lasting strengths.

The preferred gypsum to cement ratio is about 1.6:1. That is, for the preferred concentration of cement (about 26 pounds per sack) the preferred concentration of gypsum is about 41 pounds per sack.

The setting time retarder useful in the present invention may be an alkali or alkaline earth salt of citric acid, citric acid or one of the sulfonates described in U.S. Pat. No. 3,053,673. The most useful setting time retarding agents are sodium citrate and potassium citrate. The most preferred such retarding agent is sodium citrate. A setting time retarding agent is used to prevent the slurry from hardening to the extent that it becomes unpumpable until after it has been placed in the desired location.

When the setting time retarding agent is an alkali or alkaline earth salt of citric acid or citric acid, it may be present in the slurry in a concentration of from about 0.01 to about 0.25 pounds per sack. Concentrations of said citrate compounds of less than about 0.01 pound per sack will not adequately retard the setting time of the cement. This will allow the cement to set before it has been pumped into the well bore. Concentrations of said citrate compounds greater than about 0.25 pounds per sack will retard the setting time of the cement to such a great degree that the cement will never develop the desired compressive strength.

When said sulfonate compounds are used as setting time retarding agents, their maximum useful concentration is about 0.7% by weight. Greater concentrations of the sulfonate retarder destroy the ability of the cement to develop satisfactory compressive strengths. Minimum acceptable concentrations of the sulfonate retarder are about 0.1% by weight. Sulfonate concentrations of less than about 0.1% by weight do not provide setting time retardation.

The preferred concentration of sodium citrate in the composition of the present invention is about 0.12 pound per sack. The preferred concentration of the sulfonate compounds when used as retarding agents in the present invention is from about 0.2% to about 0.7% by weight of solids.

The dispersant useful in the present invention may be the dispersing agent described in U.S. Pat. No. 3,359,225. This dispersant, commonly called a densifier, is available to the oil industry under the trade designation CFR-2. Other useful dispersing agents are available under the trade names Lomar D, Tamol SN and TIC. Such dispersing agents are generally sodium salts of napthalene-sulfonic acid condensed with formaldehyde and may contain additives such as polyvinylpyrrolidone.

The dispersant CFR-2 allows the use of unusually small amounts of water in the cement slurry to which it is added. The densifier assists in dispersing particles in the water to make a useful slurry at water concentrations lower than those which would normally be acceptable. The reduced water concentrations have the effect of adding greatly to the strength of the cement after it has cured.

The dispersing agent should be present in concentrations of from about 0.1 pound to about 0.7 pound per sack. Dispersant concentrations smaller than about 0.1 pound per sack do not effectively reduce the amount of water needed to form the cement of the present invention. The excess water required to form the cement slurry when densifier concentrations are less than about 0.1 pound per sack greatly reduce the compressive strength of the cement.

Densifier concentrations greater than about 0.7 pounds per sack do not add sufficient additional strength to the cement to justify their use.

The preferred concentration of densifier is about 0.33 pound per sack.

The freezing point depressant useful in the present invention may be any of the monovalent chloride salts. The most preferred such salt is sodium chloride, although potassium chloride may be used. Divalent chloride salts such as calcium and magnesium chloride have been found to decrease the strength of the cured cement.

The freezing point depressant operates to lower the freezing point of the water used to form the cement slurry so that it will not freeze during mixing and curing of the cement.

Useful concentrations of the monovalent chloride salts as freezing point depressants range from about one pound to about 18 pounds per sack. Concentrations of less than about one pound per sack do not operate to substantially depress the freezing point of the mixing water or the slurry and are not useful. Salt concentrations of greater than about 18 pounds per sack are not necessary to decrease the freezing point of the mixing water or the slurry for the temperatures involved.

The preferred salt concentration is about three and one-half pounds per sack for most applications.

The water useful in the composition of the present invention may be fresh water, river water or pond water which is relatively free from objects large enough to foul the mixing and pumping equipment used to mix the composition and to place it in the well bore. The water should be relatively free of carbonates. Concentrations of carbonate in the range of 150–500 ppm and higher have caused unpredictable rapid setting slurry which is undesirable. The water should be substantially free of organisms such as lignins and tannins which might be present in ponds where peat moss or tundra exists. Organisms such as lignins and tannins have been known to unpredictably retard the setting time of the slurry when present in only small amounts. Such an unpredictable retardation of the slurry setting time is undesirable.

The water must be present in the composition in low concentrations. It has been found that low concentrations of water give high strengths to the cured cement. The water concentration in the composition should not be more than about five gallons per sack and not less than about three gallons per sack.

Water concentrations higher than about five gallons per sack do not give the required strength to the cured cement. Water concentrations of less than about three gallons per sack of cement will not sufficiently wet the dry solids to form a slurry. The preferred water concentration is about 3½ gallons per sack of dry solids.

A lost circulation additive may be optionally added to the slurry. The lost circulation additive prevents the slurry from escaping into porous "thief" zones in the subterranean formations through which the well bores pass. Typical lost circulation additives are gilsonite, walnut hulls and cellophane flakes.

When gilsonite and walnut hulls are used as lost circulation additives, the concentration of the additive should range from about one to about 12.5 pounds per sack. When cellophane flakes are used as fluid loss additives, the concentration of the additive should range from about 0.1 to about 1.5 pounds per sack. Concentrations lower than these minimum concentrations do not provide lost circulation control and concentrations greater than these maximum concentrations require excessive amounts of water to disperse them in the slurry. The excess water reduces the strength of the cured cement.

The composition of the present invention is prepared by mixing the dry solids together in any sequence and then adding the water to the dry solids. The lost circulation additive, however, if it is used, may be added either before or after adding the water to the other dry solids.

The low temperature oil well cementing composition of the present invention is used by injecting the slurry of dry solids and water into the annular space between the well casing and the well bore and allowing the slurry to cure or set into a hard, strong cementitious compound. The step of injecting the slurry into the annular space may comprise pumping the slurry directly into the annular space or may comprise pumping the slurry down the casing to the bottom of the well and then up into the annular space between the casing and the well bore.

The composition of the present invention as described above provides an oil well cementing composition which will not freeze during mixing or curing, even at very low formation temperatures, and which should not melt permafrost formations during curing.

The cement slurry of the present invention will remain a pumpable fluid for from about two hours to about four hours before becoming too thick to pump. It has been found that cement compositions without a setting time retarder often acquire a viscosity too high to be pumpable within five to thirty minutes after the slurry has been mixed. Although such a slurry may have other desirable properties for use in very cold subterranean formations, it cannot be useful if it develops too high a viscosity to be pumpable sooner than about one hour after it is first formed.

Cement pumping equipment normally available at the wellhead can pump slurries having an apparent viscosity of up to about 50 poises. Slurries which develop a viscosity of 50 poises within about one hour after mixing are not useful because of the danger of the slurry becoming unpumpable while in the pumping equipment and clogging it. Such slurries also have been known to produce channeling and clogging of the well casing and of the annular space. The slurry of the present invention develops a viscosity of not greater than about 15 poises within about 30 minutes after mixing and does not become unpumpable until about two hours after it is mixed.

The slurry of the present invention develops compressive strengths of at least about 500 PSI within from about seven to about 24 hours after it has been first mixed. Slurries which will not produce adequate compressive strength so that drilling or other operations in the well bore may be resumed within about 24 hours are not useful. Long delays in drilling operations while waiting for oil well cement to obtain adequate strength are not desirable and prevent a cement which requires such delays from being useful. However, a cement which obtains high compressive strengths within a reasonable time may still not be useful for cementing low temperature formations if it is not pumpable for a time sufficient to place the cement in the well.

The slurry of the present invention demonstrates a heat of hydration of less than about 20 BTU's per pound. Cements having heats of hydration higher than about 20 BTU's per pound will often melt the ice which holds the permafrost formations together. The melted ice will change the firm permafrost into a mud and water which will fall away from the cement which has been placed between the casing and the bore hole wall, thus enlarging the bore hole. Such enlargement of the bore hole is undesirable.

The following are examples of the cement for wells in low temperature formations of the present invention and are intended only to further describe certain aspects of said cement. The examples are given primarily for the purpose of illustration; and the invention, in its broader aspects, is not to be construed as limited thereto.

Scope and Procedure

To duplicate conditons under which mixing operations are carried out in low temperature environments, all materials were refrigerated at 30°F until just prior to mixing. Ice water was used for mixing and the molds for strength measurements were also refrigerated. Thickening times were determined at 32°F by circulating a refrigerated fluid through a Halliburton Company Consistometer. For compressive strength tests, samples of the compositions were cured by submerging molds containing the compositions in a refrigerated water bath.

The heats of hydration were calculated from plots of time versus temperature during the curing period. Weighted amounts of slurry were poured in replacement fillers for vacuum bottles, thermocouples embedded in the slurries and the bottles immersed in a 15°F water bath. The thermocouples were attached to a time temperature recording device and the resulting curves integrated with a planometer. This gives an average mean temperature for evaluating heat loss from the vacuum bottle replacement filler. The equation for calculation of heat of hydration used is as follows:

$\Delta H$ (BTU) = Pounds mass X specific heat X $\Delta T$ + UA$\Delta$T mean T.

An average value of heat loss for vacuum bottle fillers was determined. This value combined UA, and is 0.0477 BTU per hour per °F.

Compressive strengths, thickening times, permeabilities and heats of hydration tests were conducted in the laboratory using a cement slurry of the present invention designated as Slurry A below. Three commonly used cement slurries were also tested which are designated as Slurries X, Y and Z below.

| SLURRY A | | |
|---|---|---|
| Component | Weight, Lbs. | Composition, Weight % |
| Gypsum | 41 | 42.95 |
| API Class G Cement | 26 | 27.24 |

-continued

SLURRY A

| Component | Weight, Lbs. | Composition, Weight % |
|---|---|---|
| Water | 25 | 26.19 |
| Sodium Chloride | 3.0 | 3.14 |
| CFR-2 | 0.33 | 0.35 |
| Sodium Citrate | 0.12 | 0.13 |
| | | 100.00 |

SLURRY X

| Component | Weight, Lbs. |
|---|---|
| API Class G Cement | 47.00 |
| Gypsum | 50.00 |
| Water | 41.65 |

SLURRY Y

| Component | Weight, Lbs. |
|---|---|
| Lumnite Cement | 47.00 |
| Pozzolan | 37.00 |
| Water | 38.6 |
| Sodium Chloride | 3.35 |

SLURRY Z

| Component | Weight, Lbs. |
|---|---|
| Ciment Fondu | 43.75 |
| Pozzolan | 30.00 |
| Water | 33.2 |
| Sodium Chloride | 3.3 |

TABLE I

COMPARISON OF SLURRY PROPERTIES

| Slurry | Weight | | Viscosity (Poises) | | |
|---|---|---|---|---|---|
| | Lb/gal | Lb/ft³ | 0 Min. | 10 Min. | 20 Min. |
| A | 15.40 | 115.5 | 12 | 11 | 11 |
| X | 15.37 | 115.0 | 5 | 5 | 8 |
| Y | 15.60 | 116.6 | 5 | 8 | 8 |
| Z | 15.21 | 113.7 | 3 | 9 | 10 |

TABLE II

COMPARISON OF THICKENING TIMES AND COMPRESSIVE STRENGTHS

| Slurry | Thickening Time (32°F) Hrs:Min. | Compressive Strength at 15°F. | | | | |
|---|---|---|---|---|---|---|
| | | 16 Hr. | 1 Day | 3 Days | 7 Days | 14 Days |
| A | 5:59 | Not Set | 905 | 905 | 1,535 | 2,695 |
| X | 1:05 | 843 | 450 | 508 | 494 | 531 |
| Y | 3:00+ | Frozen | Frozen | 200 | 415 | 760 |
| Z | 3:00+ | Not Set | Frozen | 120 | 315 | 360 |

From Table II, above, it may be seen that the cement composition of the present invention (Slurry A) achieves relatively high compressive strength in as short a time as 24 hours. The other samples observed do not develop an adequate compressive strength within the required 24 hours or have too short a pumping time to be useful.

TABLE III

COMPARISON OF PERMEABILITY

| Temperature at which Test Samples cured | 15°F. |
|---|---|
| Time Test Samples Cured | 7 Days |

| Slurry | Permeability, Milidarcies |
|---|---|
| A | 0.18 |
| Y | 105.60 |
| Z | 56.60 |

From Table II it may be seen that the cement slurry of the present invention has a very low permeability after 7 days as compared to Slurries Y and Z.

TABLE IV

COMPARISON OF HEATS OF HYDRATION FROM TIME OF MIXING UNTIL HYDRATION COMPLETE

| Slurry | Initial Temperature, °F | Final Temperature, °F | Mass of Test Sample, Lb. | Total BTU | BTU per Lb. |
|---|---|---|---|---|---|
| A | 45°F | 87°F | 3.38 | 61 | 18 |
| X | 40°F | 85°F | 3.43 | 60.8 | 17.7 |
| Y | 43°F | 134°F | 3.46 | 197.3 | 57.0 |
| Z | 43°F | 186°F | 3.49 | 321.0 | 92.0 |

From Table IV it may be seen that the cement slurry of the present invention evolves a low heat of hydration while setting.

It will be apparent that many widely different embodiments of this invention may be made without departing from the spirit and scope thereof and, therefore, it is not intended to be limited except as indicated in the appended claims.

We claim:

1. A process for cementing pipe in a well which penetrates a low temperature formation comprising depositing in the space between said pipe and said formation an aqueous slurry of a hydraulic cement composition and thereafter allowing said slurry to harden, wherein said slurry consists essentially of:
   a hydraulic cement, gypsum, a monovalent chloride salt, a setting time retarding agent and water;
   wherein said hydraulic cement is present in said composition in the range of about 15 to about 35 pounds per 75 pounds of dry solids, the weight ratio of said gypsum to said hydraulic cement in said composition is in the range of about 1:1 to about 3:1, said monovalent chloride salt is present in said composition in the range of about 1 to about 3.5 pounds per 75 pounds of dry solids, said setting time retarding agent is present in said composition in the range of about 0.01 to about 0.525 pounds per 75 pounds of dry solids, and said water is present in said composition in the range of about 3 to about 5 gallons per 75 pounds of dry solids.

2. The process of claim 1 wherein there is added to said composition a dispersing agent selected from sodium salts of naphthalene sulfonic acid condensed with formaldehyde and mixtures thereof with polyvinylpyrolidone, said dispersing agent being present in said composition in the range of about 0.1 to about 0.7 pounds per 75 pounds of dry solids.

3. The process of claim 1 wherein said cement is a Portland cement selected from ASTM Classes I, II, III, IV, and V and API Classes A, B, C, G, and H.

4. The process of claim 3 wherein said setting time retarding agent is selected from the group consisting of alkali and alkaline earth salts of citric acid and citric acid, and further wherein said setting time retarding agent is present in said composition in the range of about 0.01 to about 0.25 pounds per 75 pounds of dry solids.

5. The process of claim 3 wherein said setting time retarding agent is a sulfonate present in said composition in the range of about 0.075 to about 0.525 pounds per 75 pounds of dry solids.

6. The process of claim 2 wherein there is added to said composition a lost circulation additive in an amount in the range of about 0.1 to about 12.5 pounds per 75 pounds of dry solids.

7. The process of claim 6 wherein said low temperature formation is frozen.

8. The process of claim 4 wherein there is added to said composition a dispersing agent selected from sodium salts of naphthalene sulfonic acid condensed with formaldehyde and mixtures thereof with polyvinylpyrrolidone, wherein said dispersing agent is present in said composition in the range of about 0.1 to about 0.7 pounds per 75 pounds of dry solids.

9. The process of claim 4 wherein said monovalent chloride salt is one of sodium chloride and potassium chloride.

10. The process of claim 9 wherein there is added to said composition a dispersing agent consisting essentially of a mixture of polyvinylpyrrolidone and a sodium salt of napthalene sulfonic acid condensed with formaldehyde.

11. The process of claim 9 wherein said Portland cement is present in said composition to the extent of about 26 pounds per 75 pounds of dry solids, the weight ratio of said gypsum to cement is about 1.6 to 1, said monovalent chloride salt is sodium chloride present in said composition to the extent of about 3.5 pounds per 75 pounds of dry solids, and said setting time retarding agent is sodium citrate present in said composition to the extent of about 0.12 pounds per 75 pounds of dry solids.

12. The process of claim 11 wherein there is added to said composition a dispersing agent which consists essentially of a mixture of polyvinylpyrrolidone and a sodium salt of naphthalene sulfonic acid condensed with formaldehyde wherein said dispersing agent is present in said composition to the extent of about 0.33 pounds per 75 pounds of dry solids.

13. The process of claim 12 wherein said low temperature formation is frozen.

14. The process of claim 5 wherein there is added to said composition a dispersing agent selected from sodium salts of naphthalene sulfonic acid condensed with formaldehyde and mixtures thereof with polyvinylpyrrolidone, wherein said dispersing agent is present in said composition in the range of about 0.1 to about 0.7 pounds per 75 pounds of dry solids.

* * * * *